(12) United States Patent
Kawakami

(10) Patent No.: US 8,454,248 B2
(45) Date of Patent: Jun. 4, 2013

(54) FOCAL PLANE SHUTTER FOR CAMERAS

(75) Inventor: Kenta Kawakami, Saitama (JP)

(73) Assignee: Nidec Copal Corporation, Tokyo (JP)

( * ) Notice: Subject to any disclaimer, the term of this patent is extended or adjusted under 35 U.S.C. 154(b) by 4 days.

(21) Appl. No.: 13/362,334

(22) Filed: Jan. 31, 2012

(65) Prior Publication Data
US 2012/0195586 A1 Aug. 2, 2012

(30) Foreign Application Priority Data

Jan. 31, 2011 (JP) ................................. 2011-018694

(51) Int. Cl.
*G03B 9/08* (2006.01)
(52) U.S. Cl.
USPC ......................................... 396/453; 396/456
(58) Field of Classification Search
USPC ................................. 396/453, 456
See application file for complete search history.

(56) References Cited

U.S. PATENT DOCUMENTS

| | | | | |
|---|---|---|---|---|
| 4,975,722 A | * | 12/1990 | Suzuki et al. | 396/456 |
| 5,034,765 A | * | 7/1991 | Nemoto et al. | 396/456 |
| 5,315,335 A | * | 5/1994 | Watabe et al. | 396/456 |
| 8,376,635 B2 | * | 2/2013 | Takahashi et al. | 396/456 |
| 2012/0141109 A1 | * | 6/2012 | Qian et al. | 396/453 |
| 2012/0219280 A1 | * | 8/2012 | Nishimura et al. | 396/456 |

FOREIGN PATENT DOCUMENTS

| | | | |
|---|---|---|---|
| JP | 63174024 A | * | 7/1988 |
| JP | 5-34764 | | 2/1993 |
| JP | 6-24826 | | 6/1994 |
| JP | 2001-305605 | | 11/2001 |
| JP | 2007-298544 | | 11/2007 |
| JP | 2010-8647 | | 1/2010 |

* cited by examiner

*Primary Examiner* — Christopher Mahoney
(74) *Attorney, Agent, or Firm* — Wenderoth, Lind & Ponack, L.L.P.

(57) ABSTRACT

In a first blade unit-driving unit which is rotated by elastic force of a first blade unit-driving spring in shooting, its driving pin rotates a first brake member counterclockwise and a second brake member clockwise against the elastic force of a coil spring fitted to a fitting shaft and against friction resistance force of a friction-providing part including a plate spring or the like at the final stage of the rotation of the first blade unit-driving unit, the plate spring being fitted to the fitting shaft, so that the first blade unit-driving unit is braked, and, at this point, one end part of the first blade unit-driving spring contacts a part to be pushed of the first brake member and controls the counterclockwise rotation of the first brake member, so that braking force to the first blade unit-driving unit acts on the first blade unit-driving unit larger and more surely.

20 Claims, 10 Drawing Sheets

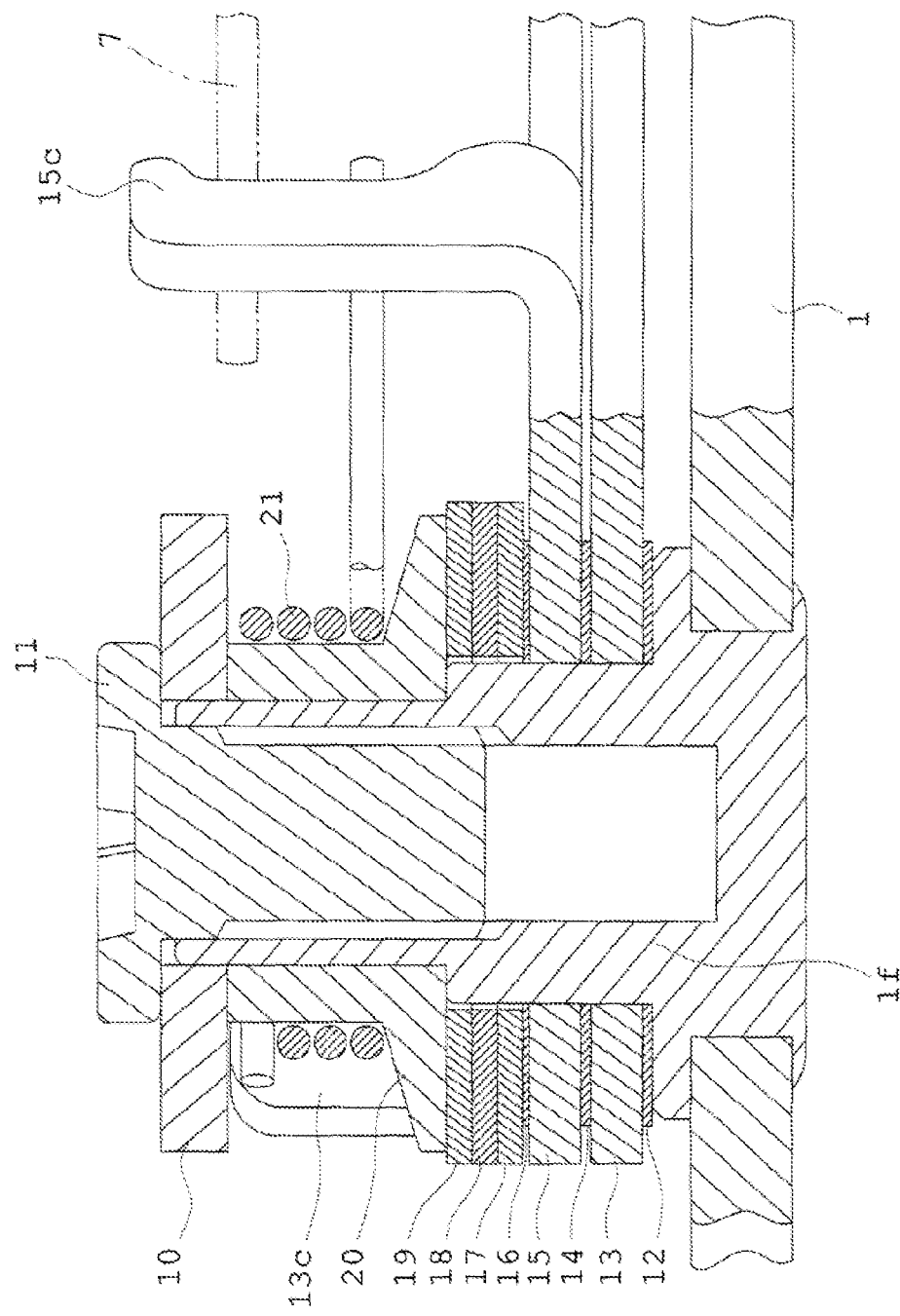

FOCAL PLANE SHUTTER FOR CAMERAS

BACKGROUND OF THE INVENTION

1. Field of the Invention

This invention relates to a focal plane shutter for cameras.

2. Description of Related Art

Focal plane shutters for cameras which are recently publically known include: focal plane shutters each of which is provided with one shutter blade unit; and focal plane shutters each of which is provided with two shutter blade units called a first blade unit and a second blade unit respectively. En the both cases, these shutter blade units have the same fundamental structure, and each of the shutter blade units consists of: two (or rarely three) arms one end of each of which is rotatably fitted to a shutter base plate; and a plurality of blades which are rotatably supported through connection shall members toward the other end (free end) of each of the two arms in turn. (However, some shutter blade units rarely include only one blade.) Also, each of the shutter blade units is made to open and close an exposure aperture by a blade unit-driving unit, and the blade unit-driving unit is usually formed in such a way that: the blade unit-driving unit is fitted to the shutter base plate and can be rotated in a reciprocating manner; its driving pin is connected to one of the arms of the shutter blade unit; and the blade unit-driving unit is rotated in one direction by the elastic force of a driving spring when shooting is performed.

Also, in focal plane shutters each of which is provided with two shutter blade units, not only a focal plane shutter which includes first blade unit-driving and second blade unit-driving units in ones, but also a focal plane shutter disclosed in Japanese Patent KOKAI No. 2007-298544 is publicly known. The focal plane shutter disclosed in Japanese Patent KOKAI No. 2007-298544 is formed in such a way that: only the first blade unit-driving unit of two blade unit-driving units is composed of two driving members which are rotatably fitted to the same shall; the first driving member of the two driving members is provided with the above-described driving pin; and the second driving member of the two driving members is connected to the above-described driving spring, so that the second driving member presses the first driving member to rotate the first driving member when the second driving member is rotated by the elastic force of the driving spring in exposure operation.

In addition, a focal plane shutter disclosed in Japanese Patent KOKAI No. 2001-305605 is also publicly known in focal plane shutters each of which is provided with two shutter blade units. The focal plane shutter disclosed in Japanese Patent KOKAI No. 2001-305605 is formed in such a way that: only the second blade unit-driving unit of two blade unit-driving units is composed of two driving members which are rotatably fitted to the same shaft; the first driving member of the two driving members is provided with the above-described driving pin; and the second driving member is connected to the above-described driving spring, so that the second driving member presses the first driving member to rotate the first driving member when the second driving member is rotated by the elastic force of the driving spring in exposure operation.

Now, these shutter blade units for focal plane shutters operate at extremely high speed in shooting and meet stoppers to be stopped on completion of the operation. Accordingly, if any countermeasures for this are not taken, the shutter blade units inevitably break or bounce large due to the impact of the stoppers against the shutter blade units. And, the large bounces of the shutter blade units cause such a disadvantage as the shutter blade units inevitably cover a part of an exposure aperture temporarily in the case where the shutter blade units operate to open the exposure aperture or as the shutter blade units inevitably open a part of the exposure aperture temporarily in the case where the shutter blade units operate to close the exposure aperture. Accordingly, up to now, various methods for braking the shutter blade units have been taken in order to brake the movements of the shutter blade units directly or indirectly at the stage just before the completions of the operations of the shutter blade units in shooting, or buffer members which are made of rubber are fixed to the stoppers in order to buffer the impact in the stops of the operations of the shutter blade units.

Also, the methods for braking the shutter blade units are roughly divided into: a method of braking the shutter blade units by making braking means directly come into contact with the blade unit-driving units; a method of braking the shutter blade units by making braking means directly come into contact with connection shafts connecting the arms and the blades; and a method of braking the shutter blade units by making braking means directly come into contact with blades. And, one of these methods is used solely or these methods are used together with each other. In these methods for braking the shutter blade units, general constitutions for the method by making braking means directly come into contact with the blade unit-driving units include a constitution in which: a brake member is rotatably fitted to a shutter base plate; and the above-described driving pin is made to meet the brake member at the stage just before the completions of the operations of the shutter blade units in shooting, to rotate the braking member against friction force caused by a friction-providing means (plate spring or friction plate).

Japanese Utility Model KOUKOKU No. HEI 6-24826 discloses one example of the constitution including only one such brake member, and Japanese Patent KOKAI No. 2010-8647 discloses one example of the constitution in which a coil spring is connected to the brake member while the constitution disclosed in Japanese Utility Model KOUKOKU No. HEI 6-24826 is being used. However, it is possible to achieve a braking effect even if the coil spring is merely connected to the braking member without providing a friction-providing means. And, this kind of constitution can be used both for the above-described focal plane shutters provided with one shutter blade unit and for the above-described focal plane shutters provided with two shutter blade units. Also, this kind of constitution can be also used for a focal plane shutter which is disclosed in Japanese Patent KOKAI No. 2007-298544 or in Japanese Patent KOKAI No. 2001-305605 and in which the first blade unit-driving unit or the second blade unit-driving unit is composed of two driving members.

In addition, in the case where a focal plane shutter provided with two shutter blade units is used, this kind of braking mechanism may be used for the blade unit-driving unit for each of the two shutter blade units, as disclosed in Japanese Patent KOKAI No. 2010-8647. Alternatively, focal plane shutters may be formed in such a way that one another kind of braking means or a plurality of another kinds of braking means as described above are used only for one of the two shutter blade units and this kind of braking mechanism is used only for the blade unit-driving unit for the other of the two shutter blade units. The present invention relates to a focal plane shutter for cameras which is provided with a braking mechanism including at least one braking member and in which the braking member is rotated by a driving pin of a blade unit-driving unit, as described above.

SUMMARY OF THE INVENTION

Now, in recent years, shutter blade units are made to have extremely high operation speed in shooting and the number of shootings remarkably increases due to the spread of digital cameras. In addition, the number of continuous shootings and the number of shots in one continuous shooting increase, so that the requirements under which focal pane shutters are used have become very harsh. As a result, in the cases of focal plane shutters including such kind of braking mechanism as disclosed in Japanese Utility Model KOUKOKU No. HEI 6-24826 or Japanese Patent KOKAI No. 2010-8647, such focal plane shutters need a braking mechanism which produces braking force larger than ever and which surely continue to maintain its performance even under the harsh requirements imposed on the focal plane shutters.

The present invention is made in order to solve such problems. The objective of the present invention is to offer a focal plane shutter for cameras in which the elastic force of a strong driving spring for rotating a shutter blade unit-driving unit in shooting is also actively used to brake the shutter blade unit-driving unit itself and which is provided with a braking mechanism that produces large braking force despite its simple structure and that is extremely excellent in endurance.

In order to achieve the above described objective, a focal plane shutter for cameras according to the present invention is formed in such a way that: the focal plane shutter includes one or two shutter blade units opening and closing an exposure aperture, one or two shutter blade unit-driving units which includes driving pins connected to the shutter blade units respectively, which are rotatably fitted to a shutter base plate, and which rotate in a reciprocating manner to make the shutter blade units open and close the exposure aperture respectively, one or two driving springs which are coil springs, one end part of each of which is connected with a shutter blade unit-driving unit, each of which is tensed by rotating the shutter blade unit-driving unit in one direction in the cocking operation of the focal plane shutter, and each of which rotates the shutter blade unit-driving unit in the other direction through the elastic force of the driving spring in shooting, and a braking mechanism which is provided for the one shutter blade unit-driving unit or at least one of the two shutter blade unit-driving units and which brakes the rotation of the shutter blade unit-driving unit in the other direction at the stage just before the completion of the rotation; the braking mechanism includes a brake member which has a first pressed part, a second pressed part, and a third pressed part, which is rotatably fitted to a fitting shaft erectly provided on the shutter base plate, which is in its initial position in which the first pressed part is located in the trajectory of the operation of the driving pin in the cocking state of the focal plane shutter, which is rotated from its initial position by the driving pin pressing the first pressed part while force against the rotation of the brake member from its initial position is applied to the brake member by pressing the end part of the driving spring as a result of the contact between the second pressed part and the end part of the driving spring at the final stage of the rotation of the shutter blade unit-driving unit in the other direction, and which is released from the press of the first pressed part due to the driving pin and from the press of the second pressed part due to the end part of the driving spring in the cocking operation of the focal plane shutter, and a friction-providing means which includes at least one plate spring, which is fitted to the fitting shaft, and by which friction resistant force is applied to the rotation of the brake member; and the third pressed part is pressed by the driving pin or a pressing part provided for the shutter blade unit-driving unit in the cocking operation of the focal plane shutter so that the brake member is returned to its initial position.

Also, in order to achieve the above described objective, a focal plane shutter for cameras according to the present invention is formed in such a way that: the focal plane shutter includes one or two shutter blade units opening and closing an exposure aperture, one or two shutter blade unit-driving units which includes driving pins connected to the shutter blade units respectively, which are rotatably fitted to a shutter base plate, and which rotate in a reciprocating manner to make the shutter blade units open and close the exposure aperture respectively, one or two driving springs which are coil springs, one end part of each of which is connected with a shutter blade unit-driving unit, each of which is tensed by rotating the shutter blade unit-driving unit in one direction in the cocking operation of the focal plane shutter, and each of which rotates the shutter blade unit-driving unit in the other direction through the elastic force of the driving spring in shooting, and a braking mechanism which is provided for the one shutter blade unit-driving unit or at least one of the two shutter blade unit-driving units and which brakes the rotation of the shutter blade unit-driving unit in the other direction at the stage just before the completion of the rotation; the braking mechanism includes a brake member which has a first pressed part and a second pressed part, which is rotatably fitted to a fitting shaft erectly provided on the shutter base plate, which is in its initial position in which the first pressed part is located in the trajectory of the operation of the driving pin in the cocking state of the focal plane shutter, which is rotated from its initial position by the driving pin pressing the first pressed part while force against the rotation from its initial position is applied to the brake member by pressing the end part of the driving spring as a result of the contact between the second pressed part and the end part of the driving spring at the final stage of the rotation of the shutter blade unit-driving unit in the other direction, and which is released from the press of the first pressed part due to the driving pin and from the press of the second pressed part due to the end part of the driving spring in the cocking operation of the focal plane shutter, and a coil spring for the brake member which is connected with the brake member, which is tensed when the brake member is rotated from its initial position, and the elastic force of which makes the brake member return to its initial position when the brake member is released from the press of the first pressed part due to the driving pin.

Also, in the case where the braking mechanism is provided with the coil spring for the brake member as described above, in addition, a friction-providing means which includes at least one plate spring and by which friction resistant force is applied to the rotation of the brake member is fitted to the fitting shaft. As a result, braking force to the shutter blade unit-driving unit in the case where the focal plane shutter is provided with the coil spring and the friction-providing plate becomes larger than that in the case where the braking mechanism is provided with only the coil spring for the brake member.

Also, in the case where the brake member and the friction-providing means are fitted to the fitting shaft in each of the above-described focal pane shutters for cameras, an auxiliary brake member including a first pressed part and a second pressed part is rotatably fitted to the fitting shaft. And, the auxiliary brake member is formed in such a way that: friction resistant force is applied to the auxiliary brake member together with the brake member by the friction-providing means; the auxiliary brake member is in its initial position in which the first pressed part is located in the trajectory of the operation of the driving pin of the shutter blade unit-driving unit in the cocking state of the focal plane shutter; the auxiliary brake member is rotated by the driving pin pressing the first pressed part at the final stage of the rotation of the shutter blade unit-driving unit in shooting; and the auxiliary brake member is returned to it initial position by pressing the second pressed part through the driving pin or a pressing part provided for the shutter blade unit-driving unit, in the cocking operation of the focal plane shutter. As a result, braking force to the shutter blade unit-driving unit in the case where the auxiliary brake member, together with the brake member and the friction-providing plate, is fitted to the fitting shaft becomes larger than that in the case where only the brake member and the fiction-providing member are fitted to the fitting shaft.

Also, in the case where the brake member is fitted to the fitting shaft, whether the friction-providing means is fitted to the fitting shaft or not, the focal plane shutter is formed in such a way that the focal plane shutter further includes: an auxiliary brake member which includes a pressed part, which is rotatably fitted to the fitting shaft, the rotation of which, together with the rotation of the brake member, is given friction resistant force by the friction-providing means, which is in its initial position in which the pressed part is located in the trajectory of the operation of the driving pin of the shutter blade unit-driving unit in the cocking state of the focal plane shutter, and which is rotated by the driving pin pressing the pressed part at the final stage of the rotation of the shutter blade unit-driving unit in shooting; and a coil spring for the auxiliary brake member which is connected with the auxiliary brake member, which is tensed when the auxiliary brake member is rotated from its initial position, and the elastic force of which makes the auxiliary brake member return to its initial position when the auxiliary brake member is released from the press of the pressed part due to the driving pin. As a result, braking force to the shutter blade unit-driving unit becomes larger.

In this case, the coil springs for the brake member and for the auxiliary brake member consist of one coil spring which is wound around the fitting shaft, one end part of the coil spring is connected with the brake member and the other end part of the coil spring is connected with the auxiliary brake member, the brake member and the auxiliary brake member are pressed by the driving pill at the final stage of the rotation of the shutter blade unit-driving unit in shooting and are rotated from respective their initial positions against the elastic force of the one coil spring in the directions opposite to each other, and the brake member and the auxiliary brake member are returned to respective their initial positions by the elastic force of the one coil spring in the cocking operation of the focal plane shutter. As a result, focal plane shutters formed in such a manner becomes advantageous from the standpoints of a space to arrange the braking mechanism and of costs.

In addition, each of the above-described focal plane shutters for cameras may be formed in such a way that: one of the two shutter blade unit-driving units is composed of a first driving member and a second driving member which are rotatably fitted to the same shaft on the shutter base plate; the first driving member includes the driving pin; the one end part of the driving spring is connected with a spring-connection part of the second driving member; and the second driving member presses the first driving member with the elastic force of the driving spring and rotates the first driving member in the other direction, in shooting.

For conventional braking mechanisms in which: a shutter blade unit-driving unit includes a driving pin connected to a shutter blade unit and is rotated directly or indirectly by the elastic force of a driving spring in shooting; and a brake member rotatably fitted to the shutter base plate is rotated by the driving pin against friction resistant force of a friction-providing means like a plate spring and/or against the elastic force of a coil spring at the final stage of the rotation of the shutter blade unit-driving unit so that the shutter blade unit-driving unit is braked, the present invention gives to such conventional braking mechanisms a mechanism in which the elastic force of the driving spring rotating the shutter blade unit-driving unit actively controls the rotation of the brake member when the driving pin presses and rotates the brake member at the final stage of the rotation of the shutter blade unit-driving unit in shooting. As a result, it is possible to achieve large braking force despite the fact that the braking mechanism has a simple structure, and it is possible to surely maintain the performance of focal plane shutters for cameras even though the focal plane shutters are used far beyond the number of shootings at which conventional focal plane shutters are tolerable.

BRIEF DESCRIPTION OF THE DRAWINGS

FIG. 4 is a cross sectional view showing a braking mechanism-fitting structure when the focal plane shutter of the present embodiment is viewed from the left side of FIG. 2.

FIG. 5 is a view showing a first brake member and a second brake member for the present embodiment.

DETAILED DESCRIPTION OF THE PREFERRED EMBODIMENTS

Figure 1:
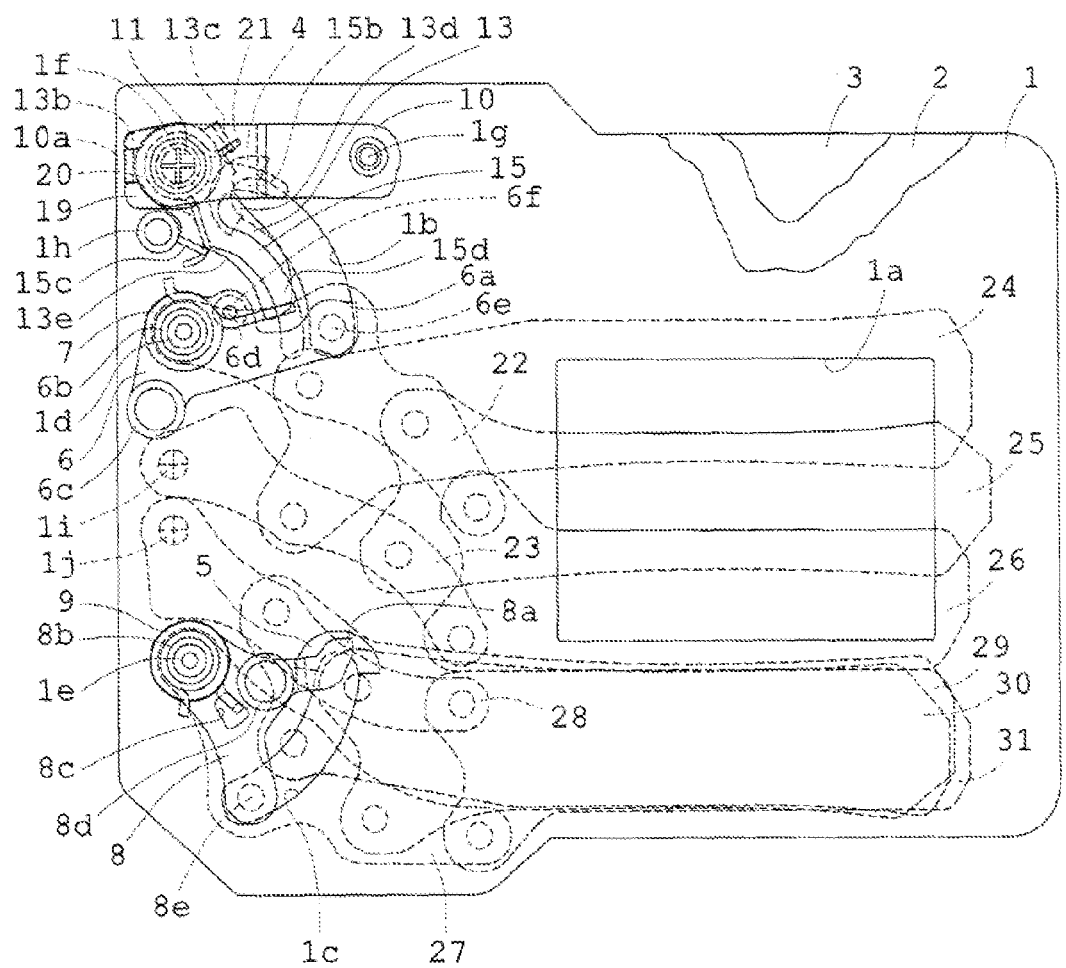
FIG. 1 is a plane view showing the whole of a focal plane shutter according to an embodiment of the present invention in its cocked state.

The present invention is explained with the embodiment shown in the drawings. Besides, the focal plane shutter of the present embodiment is formed in such a way that the present invention is applied only to a first blade unit-driving unit in a focal plane shutter in which exposure aperture-opening and closing operations of two shutter blade units called first blade unit and second blade unit respectively are performed by the first blade unit-driving unit and a second blade unit-driving unit respectively. However, like the embodiment disclosed in Japanese Patent KOKAI No. 2010-8647, the present invention can be also applied to the second blade unit-driving unit. Also, as can be understood without the necessity of giving explanation with an embodiment referred, the present invention can be also applied to focal plan shutters each of which is provided with one shutter blade unit, or, even in the cases of focal plane shutters each of which is provided with two shutter blade units, the present invention can be also applied to focal plane shutters in which a first blade unit-driving member is composed of two driving members as in Japanese Patent KOKAI No. 2007-298544 or to focal plane shutters in which a second blade unit-driving unit is composed of two driving members as in Japanese Patent KOKAI No. 2001-305605.

In addition, as publically known, focal plane shutters include focal plane shutters called direct-type one as disclosed in Japanese Patent KOKAI No. 2007-298544 and focal plane shutters called locking-type one as disclosed in Japanese Patent KOKAI No. 2001-305605, Japanese Utility Model KOUKOKU No. HEI 6-24826, or Japanese Patent KOKAI No. 2010-8647, and direct-type focal plane shutters are different from locking-type focal plane shutters in a mechanism for keeping a shutter blade unit-driving unit that is rotated by the elastic force of a driving spring in shooting being in a state just before the start of the operation of the shutter blade unit-driving unit. The present invention can be applied to both of direct-type and locking-type focal plane shutters. The focal plane shutter of the present embodiment is formed as a locking-type one.

Embodiment

Figure 2:
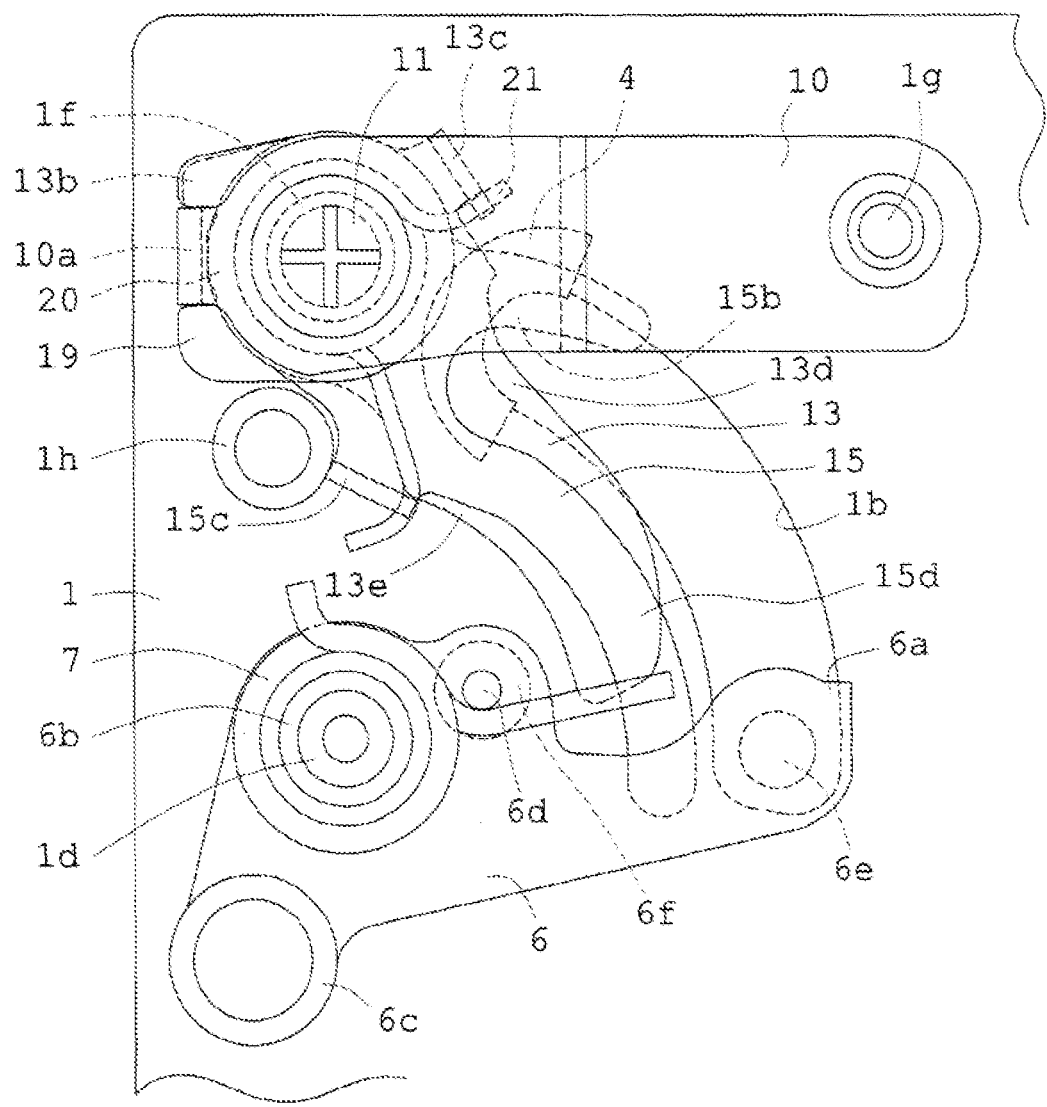
FIG. 2 is a plane view showing only the first blade unit-driving system shown in FIG. 1 while the first blade unit-driving system is being enlarged.
Figure 3:
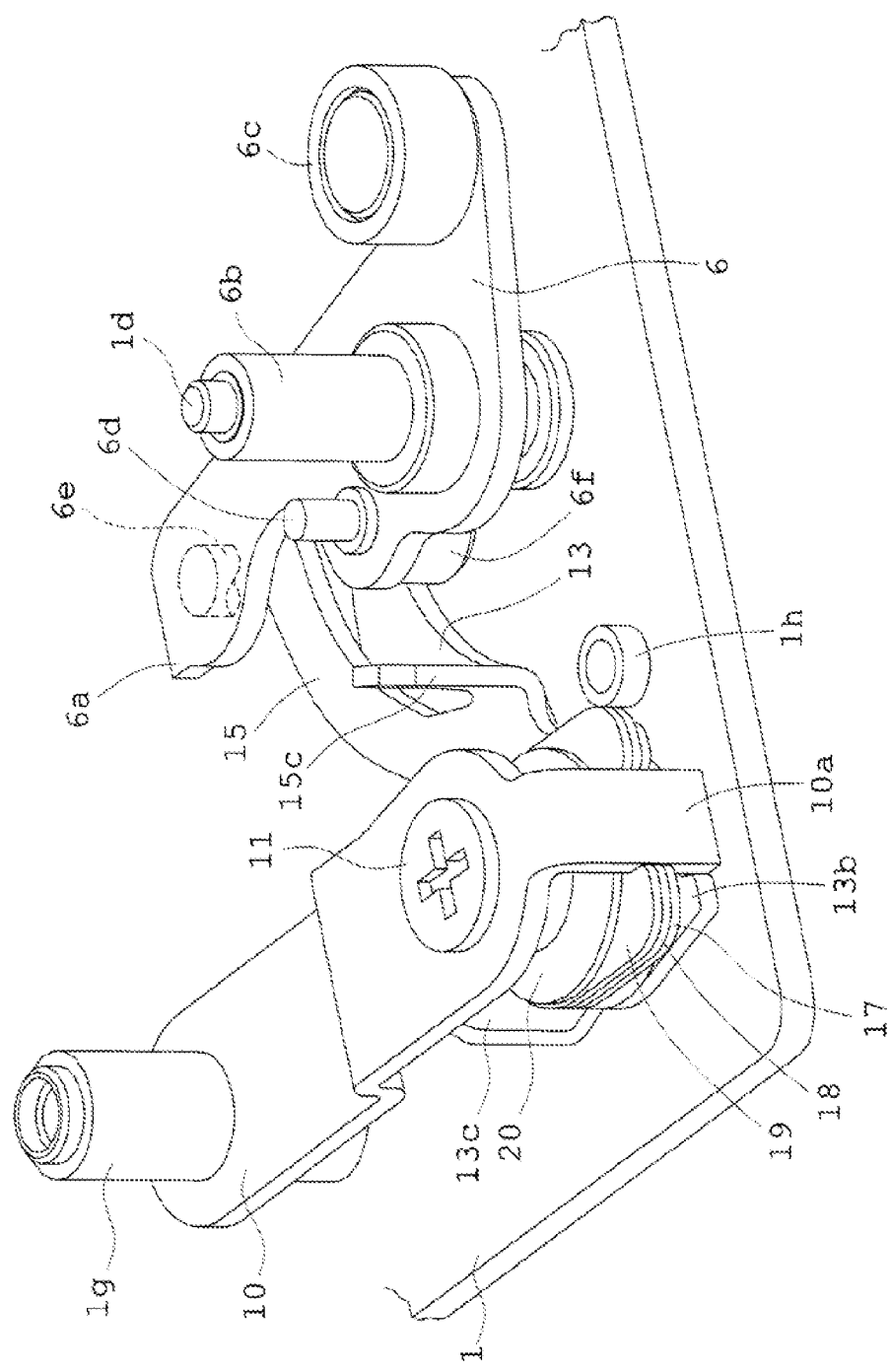
FIG. 3 is a perspective view showing the focal plane shutter of the present embodiment when the focal plane shutter of the present embodiment is viewed from the left-upper side of FIG. 2.
Figure 5A:
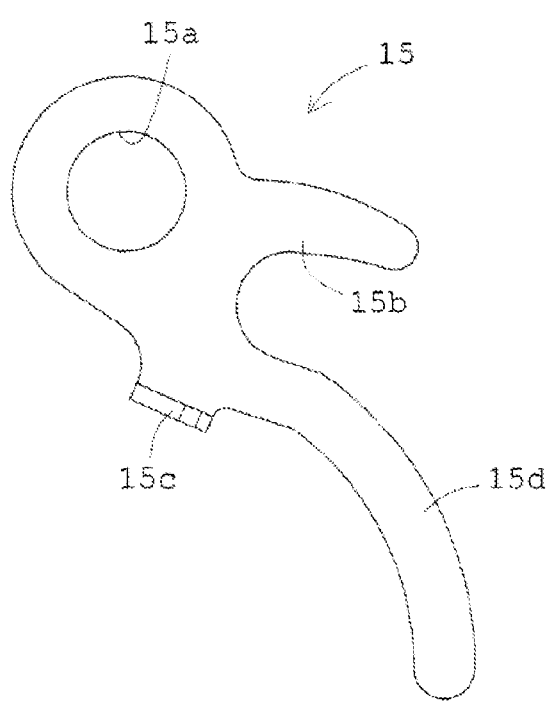
FIG. 5A is a plane view showing the first brake member.
Figure 5B:
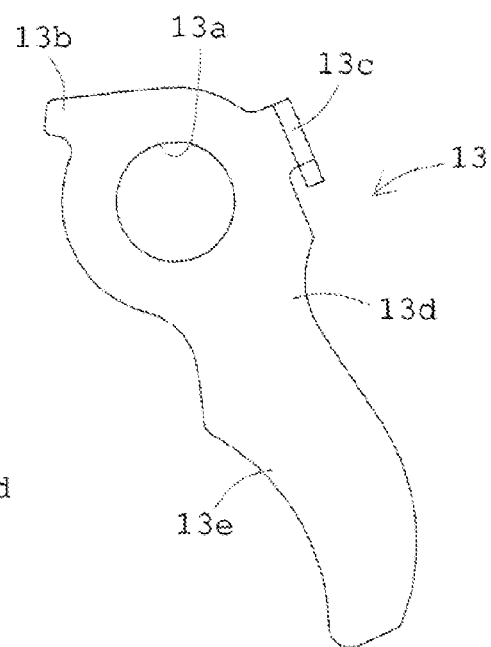
FIG. 5B is a plane view showing the second brake member.

First, the constitution of the focal plane shutter of the present embodiment is explained using FIGS. 1 to 5. Besides, among FIGS. 1 to 5, FIGS. 1 to 3 show a cocked state of the focal plane shutter of the embodiment, or a state in which the focal plane shutter is on standby for shooting. FIG. 1 is a plane view showing the whole of the focal plane shutter of the present embodiment, FIG. 2 is a plane view showing only the first blade unit-driving system shown in FIG. 1 while the first blade unit-driving system is being enlarged, FIG. 3 is a perspective view showing the focal plane shutter of the present embodiment when the focal plane shutter of the present embodiment is viewed from the left-upper side of FIG. 2. Also, FIG. 4 is a cross sectional view showing a braking mechanism-fining structure when the focal plane shutter of the present embodiment is viewed from the left side of FIG. 2. In addition, FIG. 5 is a view showing a first brake member and a second brake member for the present embodiment, or showing one examples of brake members and auxiliary brake members in the present invention, FIG. 5A is a plane view showing the first brake member, and FIG. 5B is a plane view showing the second brake member.

In FIG. 1, a shutter base plate 1 is provided with a rectangle-shaped opening 1a which is located on the approximately middle portion of the shutter base plate 1. Also, a middle plate 2 and an auxiliary base plate 3 are fitted to the back side of the shutter base plate 1 in turn while the middle plate 2 is at a predetermined distance from the auxiliary base plate 3. However, because such a manner of fitting the middle plate 2 and the auxiliary base plate 3 is publically known and is not directly related to the present invention, a part of the shutter base plate 1 and a part of the middle plate 2 are omitted in FIG. 1 in order to see that the middle plate 2 and the auxiliary base plate 3 exist in the focal plane shutter. Also, in the case where the focal plane shutter of the present embodiment is incorporated into a digital camera, the shutter base plate 1 may be fitted on the image-pickup-device side or the auxiliary base plate 3 may be fitted on the image-pickup-device side. The latter case is explained in the following explanation. Accordingly, the front side of FIG. 1 naturally becomes the object side.

Also, in the present embodiment, a blade unit room for a first blade unit is formed between the shutter base plate 1 and the middle plate 2, and a blade unit room for a second blade unit is formed between the middle plate 2 and the auxiliary base plate 3. However, the blade unit room between the shutter base plate 1 and the middle plate 2 may as well be used for the second blade unit, and the blade unit room between the middle plate 2 and the auxiliary base plate 3 may as well be used for the first blade unit. And, the middle plate 2 and the auxiliary base plate 3 are also provided with openings which are similar to the opening 1a in shape, respectively, while the openings are being aligned with the opening 1a. Usually, in the case where focal plane shutters like the present embodiment are used for single-lens reflex cameras, an exposure aperture is often formed by a plurality of openings among the three openings. However, in the present embodiment, the exposure aperture is formed only by the opening 1a.

In FIG. 1, two arc-shaped elongate holes 1b and 1c are formed on a portion of the shutter base plate 1 on the left side of the opening 1a. Well-known buffer members 4 and 5 the plane shapes of which are approximately shaped like the letter "C" and which are made of rubber are fitted to the upper edges of the holes 1b and 1c, respectively. Because two below-described shutter blade unit-driving units 6 and 8 are rotated in the counterclockwise direction in shooting and move two below-described shutter blade units from the lower side in FIG. 1 to the upper side in FIG. 1 in the present embodiment, the buffer members 4 and 5 are fitted to the upper edges of the elongate holes 1b and 1c respectively. However, in the case where the two shutter blade units are moved from the upper side in FIG. 1 to the lower side in FIG. 1, the buffer members 4 and 5 are naturally fitted to the lower edges of the elongate holes 1b and 1c respectively.

The shutter base plate 1 is provided with shafts 1d and 1e, a shaft 1f for fitting a braking mechanism (refer to FIGS. 2 and 4), a pillar 1g, and a cylindrical stopper 1h while the shafts 1d, 1e, and 1f the pillar 1g, and the stopper 1h are erecting on the object-side surface of the shutter base plate 1. In addition, the shutter base plate 1 is provided with a shaft for rotatably fitting a well-known cocking member and a plurality of pillars to which a supporting plate for fitting a well-known electromagnet or the like is fitted parallel to the shutter base plate 1 while the shaft for rotatably fitting the cocking member and the pillars for fitting the supporting plate are erecting on the object-side surface of the shutter base plate 1. Because these parts of the shutter base plate 1 are not directly related to the present invention, these parts of the shutter base plate 1 are omitted in the drawings. However, because the pillar 1g which is one of the pillars for fitting such supporting plate is necessary for an explanation of the present embodiment, the pillar 1g is shown in the drawing.

Also, the shutter base plate 1 provided with shafts 1i and 1j, the shafts 1i and 1j erecting on the back-side surface of the shutter base plate 1, or on the image pickup device-side surface of the shutter base plate 1. In addition, the shutter base plate 1 is provided with two shafts which erect on the back-side surface of the shutter base plate 1 and are concentric with the shafts 1d and 1e respectively. However, because the two shafts concentric with the shafts 1d and 1e are hard to draw, the two shafts concentric with the shafts 1d and 1e are not shown in the drawings. And, the below-described first blade unit (a shutter blade unit which opens an exposure aperture in shooting) is fitted to the shaft concentric with the shaft 1d and to the shaft 1i, and the below-described second blade unit (a shutter blade unit which closes the exposure aperture in shooting) is fitted to the shaft concentric with the shaft 1e and to the shaft 1j.

A first blade unit-driving unit 6 which is made of synthetic resin is rotatably fitted to the shaft 1d erectly provided on the shutter base plate 1. The first blade unit-driving unit 6 includes an engaged part 6a and a tube part 6b. In addition, the first blade unit-driving unit 6 is provided with: a roller 6c and a spring-connection part 6d which are located on the object side; and a driving pin 6e and a roller 6f which are located on the shutter-base-plate-1 side. And, the shaft 1d is rotatably fitted to the tube part 6b. Also, the driving pin 6e passes through the elongate hole 1b and is connected to the below-described first blade unit in the blade unit room. However, only a part of the driving part 6e is shown with broken line in FIG. 3, and a part of the driving pin 6e which is on the top end side of the driving pin 6e is omitted in the drawings.

The coil part of a first blade unit-driving spring 7 which is a coil spring is loosely fitted to the tube part 6b of the first blade unit-driving unit 6. And, one end part of the first blade unit-driving spring 7 is connected with a well-known elastic force-adjusting member which is not shown in the drawings (and which is usually called ratchet member or the like and fitted to the supporting plate that is not shown in the drawings), and the other end part of the first blade unit-driving spring 7 is connected with the spring-connection part 6d of the first blade unit-driving unit 6. The first blade unit-driving unit 6 is biased by the first blade unit-driving spring 7 in such a way that the first blade unit-driving unit 6 is rotated in the counterclockwise direction.

A second blade unit-driving unit 8 which is made of synthetic resin is rotatably fitted to the shaft 1e erectly provided on the shutter base plate 1. The second blade unit-driving unit 8 includes an engaged part 8a, a tube part 8b, and a hole-shaped spring-connection part 8c. In addition, the second blade unit-driving unit 8 is provided with: a roller 8d which is located on the object side; and a driving pin 8e which is located on the shutter-base-plate-1 side, and the shaft 1e is rotatably fitted to the tube part 8b. And, the driving pin 8e passes through the elongate hole 1c and is connected to the below-described second blade unit in the blade unit room.

The coil part of a second blade unit-driving spring 9 which is a coil spring is loosely fitted to the tube part 8b of the second blade unit-driving unit 8. And, one end part of the second blade unit-driving spring 9 is connected with a publically-known elastic force-adjusting member which is not shown in the drawings, and the other end part of the second blade unit-driving spring 9 is connected with the spring-connection part 8c. The second blade unit-driving unit 8 is biased by the second blade unit-driving spring 9 in such a way that the second blade unit-driving unit 8 is rotated in the counterclockwise direction.

A braking mechanism consisting of a plurality of members is fitted to the fitting shaft 1f erectly provided on the shutter base plate 1. A cover plate 10 which is fitted to the top end of the fitting shaft 1f is also fitted to the pillar 1g erectly provided on the shutter base plate 1. That is to say, the pillar 1g has an annular level-difference plane at the approximately middle point of the pillar 1g in the longitudinal direction, and the diameter of the pillar 1g becomes small on the top-end side of the pillar 1g. Accordingly, the pillar 1g is inserted into a hole formed on one edge of the cover plate 10 from the top end of the pillar 1g until the cover plate 10 is put on the annular level-difference plane, a hole formed on another edge of the cover plate 10 is aligned with a thread hole formed on the top end of the fitting shaft 1f, and the cover plate 10 is screwed to the fitting shaft 1f by a screw 11. And, the cover plate 10 is provided with a curved part 10a, and the top edge of the curved part 10a becomes close to the shutter base plate 1 when the cover plate 10 is fitted to the fitting shaft 1f.

As shown in FIG. 4, a washer 12, a second brake member 13, a washer 14, a first brake member 15, a washer 16, three plate springs 17, 18, and 19, and a sleeve member 20 are fitted to the fitting shaft 1f in that order from the shutter-base-plate-1 side. Among these components, the three washers 12, 14, and 16 are thin and made of synthetic resin. The shaft part of the fitting shaft 1f having a large diameter is rotatably fitted into circular holes of the three washers.

The second brake member 13, which is fitted to the fitting shaft 1f next to the washer 12 and corresponds to the auxiliary brake member of the present invention, is made of metal. As shown in FIG. 5B, the second brake member 13 includes a hole 13a, a connection part 13b, a spring-connection part 13c, and two pressed parts 13d and 13e. The shaft part of the fitting shaft 1f having a large diameter is rotatably fitted into the hole 13a. And, the connection part 13b is a part which meets the curved part 10a of the cover plate 10 when the second brake member 13 is rotated in the counterclockwise direction. The spring-connection part 13c is a part which is connected with one end part of a below-described coil spring 21. Also, the pressed part 13d is a part which is pressed by the driving pin 6e of the first blade unit-driving unit 6 in shooting, and the pressed part 13e is a part which is pressed by the roller 6f of the first blade unit-driving unit 6 in the cocking operation.

Also the first brake member 15, which is fitted to the fitting shaft 1f next to the washer 14 and corresponds to the brake member of the present invention, is also made of metal. As shown in FIG. 5A, the first brake member 15 includes a hole 15a and three pressed part 15b, 15c, and 15d. The shaft part of the fitting shaft 1f having a large diameter is rotatably fitted into the hole 15a. And, the pressed part 15b is a part which is pressed by the driving pin 6e of the first blade unit-driving unit 6 in shooting, the pressed part 15d is a part which is pressed by the driving pin 6e of the first blade unit-driving unit 6 in the cocking operation. Also, the pressed part 15c formed as a curved part is a part which is pressed by the end part of the first blade unit-driving spring 7 at the final stage of the rotation of the first blade unit-driving unit 6 in shooting. The pressed part 15c also plays roles as a connection part which meets the stopper 1h provided for the shutter base plate 1 and as a spring-connection part which is connected with the other end part of the below described coil spring 21.

The three plate springs 17, 18, and 19 are directly stacked and fitted to the shaft part of the fitting shaft 1f having a large diameter. These three plate springs 17, 18, and 19 have the same shape, and each of the plate springs 17, 18, and 19 has an approximately letter "U"-shaped plane surface having a keyhole-like missing portion, which is not clearly shown. The curved part 10a of the cover plate 10 is put between and supported by the two open leg parts of each of the three plate springs 17, 18, and 19, and a fitting part is formed in the recess-most side of the missing portion and in the shape of incomplete circle which is lacking in the range of angles more than 180 degrees (or approximately in the shape of the letter "C"). The fitting part formed in the recess-most side of the missing portion is rotatably fitted to the fitting shaft 1f. As a result, the curved part 10a of the cover plate 10 plays not only a role as a stopper for the second brake member 13 as described above but also a role as a stopper for the rotations of the plate springs 17, 18, and 19 having such a plane shape.

The shaft part of the shaft 1f having a small diameter is rotatably fitted into a hole which is formed in the middle of the sleeve member 20, and the sleeve member 20 is made to come into contact with the plate spring 19. The cover plate 10 is fitted over the sleeve member 20 by the screw 11, as described above. And, as the screw 11 is tightened, the contact pressures between the members 12 to 19 which are fitted to the shaft parts oldie fitting shaft 1f having a large diameter increase. As the screw 11 is loosened, the contact pressures between the members 12 to 19 decrease. As a result, in the present embodiment, it is possible to adjust friction resistant force to the rotations of the two brake members 13 and 15 by adjusting tightness of the screw 11, in making the focal plane shutter.

In the present embodiment, the coil spring 21 is wounded around the sleeve member 20. One end part of the coil spring 21 is connected with the spring-connection part 13c of the second brake member 13, and the other end part of the coil spring 21 is connected with the pressed part 15c of the first brake member 15. As a result, in FIGS. 1 and 2, the second brake member 13 is rotated in the counterclockwise direction by the elastic force of the coil spring 21 and then the connection part 13b meets the carved part 10a of the cover plate 10, and the first brake member 15 is rotated in the clockwise direction and then the pressed part 15c meets the stopper 1h of the shutter base plate 1. Besides, the coil spring 21 is omitted in FIG. 3.

Besides, in the present embodiment, although the first blade unit-driving unit 6 is provided with a braking mechanism having such a structure, the second blade unit-driving unit 8 is not provided with a similar braking mechanism. The reason why the second blade unit-driving unit 8 is not provided with such a braking mechanism is that the present embodiment presumes that the second blade unit is given a plurality of well-known braking means which are not shown in the drawings. However, the second blade unit-driving unit 8 may be provided with a braking mechanism as in the embodiment disclosed in Japanese Patent KOKAI No. 2010-8647. In this case, braking mechanisms provided for the second blade unit-driving unit 8 may have the same structure as the above-described braking mechanism for the present embodiment or may be different from the braking mechanism in the present embodiment in structure. Also, braking mechanisms for the focal plan shutter according to the present invention are not necessarily provided for the first blade unit-driving unit 6 as in the present embodiment and may be provided for only the second blade unit-driving unit 8.

Finally, the structures of the first and second blade units which are arranged on the back side of the shutter base plate 1 are explained using FIG. 1. However, because the structures of such first and second blade units are well known, the structures of these blade units are briefly explained. First, the first blade unit is composed of: an arm 22 one end of which is pivotally fitted to the shaft that is concentric with the shaft 1d, the shaft being not shown in the drawings; an arm 23 one end of which is pivotally fitted to the shaft 1i; and three blades 24, 25, and 26 which are pivotally supported by both of the arms 22 and 23 toward the top ends of the arms 22 and 23 in turn. The blade 26 which is placed nearest to the top ends of the arms 22 and 23 plays a role as a slit-forming blade. Also, as well known, the arm 22 is provided with a hole, and the driving pin 6e of the first blade unit-driving unit 6 is fitted into the hole formed in the arm 22.

On the other hand, although the second blade unit has the same structure as the first blade unit does, the second blade unit is arranged in such a way that the second blade unit is reversed relative to the first blade unit. And, the second blade unit is composed of: an arm 27 one end of which is pivotally fitted to the shaft that is concentric with the shaft 1e, the shaft being not shown in the drawings; an arm 28 one end of which is pivotally fitted to the shaft 1j; and three blades 29, 30, and 31 which are pivotally supported by both of the arms 27 and 28 toward the top ends of the arms 27 and 28 in turn. The blade 31 which is placed nearest to the top ends of the arms 27 and 28 plays a role as a slit-forming blade. Also, as well known, the arm 27 is provided with a hole, and the driving pin 8e of the second blade unit-driving unit 8 is fitted into the hole formed in the arm 27.

Next, the operation of the focal plane shutter of the present embodiment having such a structure is explained. FIG. 1 shows the cocked state of the shutter, or a state in which the shutter is on standby for shooting. Accordingly, the engaged part 6a of the first blade unit-driving unit 6 engages with a first blade unit-locking unit which is not shown in the drawings, so that the first blade unit-driving unit 6 is locked by the first blade unit-locking unit. As a result, the first blade unit-locking unit prevents the first blade unit-driving unit 6 from being rotated in the counterclockwise direction by the elastic force of the first blade unit-driving spring 7. And, at this point, the three blades 24 to 26 of the first blade unit are unfolded and cover the opening 1a.

Also, at this point, the two brake members 13 and 15 are biased by the coil spring 21 so that the two brake members 13 and 15 are rotated in the directions opposite to each other respectively, as shown in FIG. 2. The rotation of the first brake member 15 is stopped by making the pressed part 15c of the first brake member 15 meet the stopper 1h, and the rotation of the second brake member 13 is stopped by making the connection part 13b of the second brake member 13 meet the curved part 10a of the cover plate 10. And, the respective pressed parts 13d and 15b are located in the trajectory of the operation of the driving pins 6e of the first blade unit-driving unit 6. The initial positions of the two brake members 13 and 15 are the positions of the two brake members 13 and 15 which are shown in FIG. 2, respectively.

On the other hand, the engaged part 8a of the second blade unit-driving unit 8 engages with a second blade unit-locking unit which is not shown in the drawings, so that the second blade unit-driving unit 8 is locked by the second blade unit-locking unit. As a result, the second blade unit-locking unit prevents the second blade unit-driving unit 8 from being rotated in the counterclockwise direction by the elastic force of the second blade unit-driving spring 9. And, at this point, the three blades 29 to 31 for the second blade unit are folded and stored in an area on the lower side of the opening 1a.

When a release button of a camera is pressed in shooting, as well known, electric current is applied to electromagnets for the first and second blade units which are not shown in the drawings, so that iron piece members which are fitted to a locked first blade unit-releasing unit and a locked second blade unit-releasing unit respectively are attracted and held by the electromagnets for the first and second blade units, respectively, the locked first blade unit-releasing unit and the locked second blade unit-releasing unit being not shown in the drawings. And, just after the iron piece members are attracted and held by the electromagnets, the supply of electric current to the electromagnet for the first blade unit is first cut off, and then the supply of electric current to the electromagnet for the second blade unit is cut off after prescribed time is passed by, so that the locked first blade unit-releasing unit and the locked second blade unit-releasing unit start to move in turn by the elastic forces of respective springs. As a result, the first blade unit-locking unit and the second blade unit-locking unit which are not shown in the drawings are rotated in turn, and the first blade unit-driving unit 6 is released from the engagement with the first blade unit-locking unit and the second blade unit-driving unit 8 is released from the engagement with the second blade unit-locking unit.

In this case, the first blade unit-driving unit 6 which is first released from the engagement with the first blade unit-locking unit is first rotated in the counterclockwise direction by the strong elastic force of the first blade unit-driving spring 7, so that the arm 22 is rotated in the counterclockwise direction by the driving pin 6e. As a result, the three blades 24 to 26 of the first blade unit move upward while the overlaps between respective adjacent blades of the three blades 24 to 26 are increasing, so that the three blades 24 to 26 open the opening 1a from the lower side of the opening 1a. On the other hand, the second blade unit-driving unit 8 which is released from the engagement with the second blade unit-locking unit later than the first blade unit-driving unit 6 is rotated in the counterclockwise direction by the strong elastic force of the second blade unit-driving spring 9, so that the arm 27 is rotated in the counterclockwise direction by the driving pin 8e. As a result, the three blades 29 to 31 of the second blade unit move upward while the overlaps between respective adjacent blades of the three blades 29 to 31 are decreasing, so that the three blades 29 to 31 close the opening 1a from the lower side of the opening 1a. Afterward, the image plane is exposed by a slit which is formed between the slit-forming blades 26 and 31 of the first and second blade units.

Figure 6:
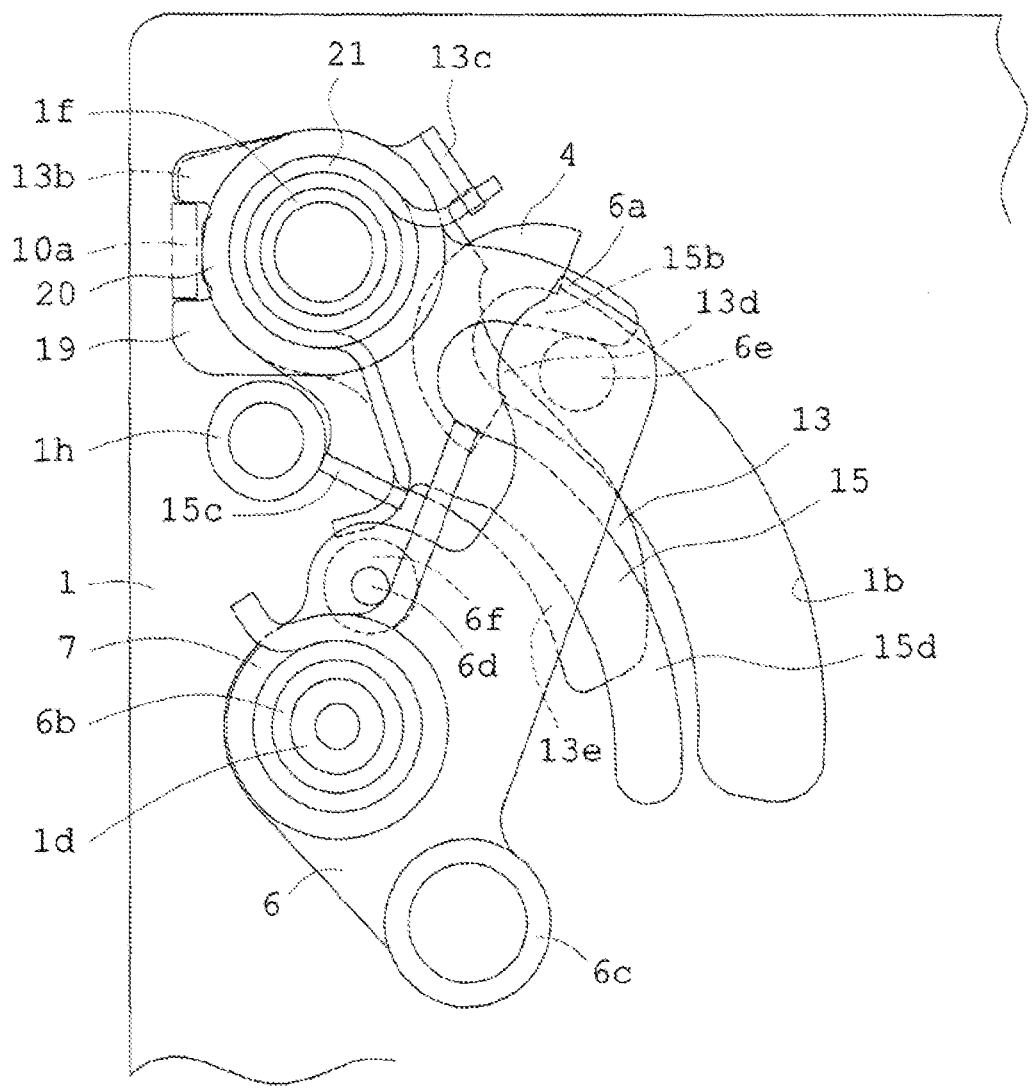
FIG. 6 is a partial plane view for the present embodiment showing a state in which the driving pin meets the first brake member at the stage of the completion of the operation of the first blade unit-driving unit in shooting.

When the exposure operation is performed in such a manner and the focal plane shutter reaches the stage where the exposure operation is completed, the driving pin 6e of the first blade unit-driving unit 6 meets the pressed parts 13d and 15b of the two brake members 13 and 15. In this case, focal plane shutters according to the present invention may be formed in such a way that the driving pin 6e meets the pressed part 15b of the first brake member 15 after the driving pin 6e meets the pressed part 13d of the second brake member 13 or in such a way that the driving pin 6e meets both of the pressed parts 13d and 15b at the same time. However, the focal plane shutter of the present embodiment is formed in such a way that the driving pin 6e meets the pressed part 13d of the second brake member 13 after the driving pin 6e meets the pressed part 15b of the first brake member 15. And, FIG. 6 shows a state of the focal plane shutter of the present embodiment at a moment at which the driving pin 6e first meets the pressed part 15b of the first brake member 15. Besides, the cover plate 10 which is shown in FIG. 2 is omitted in FIG. 6, as well as FIGS. 6, 7, 9, and 10.

When the driving pin 6e of the first blade unit-driving unit 6 first meets the pressed part 15b of the first brake member 15 as shown in FIG. 6, the first brake member 15 is rotated in the counterclockwise direction. At this point, the first brake member 15 is rotated: against friction resistant force caused by a friction-providing means consisting of the plate springs 17 to 19 fitted to the fitting shaft 1h; and against the elastic force of the coil spring 21, so that these forces against the rotation of the first brake member 15 are applied to the first blade unit-driving unit 6 as braking force.

Also, just after the first brake member 15 is made to start to rotate in the counterclockwise direction in such a manner, the driving pin 6e of the first blade unit-driving unit 6 meets the pressed part 13d of the second brake member 13, so that the second brake member 13 is rotated in the clockwise direction. Also in this case, the second brake member 13 is rotated: against friction resistant force caused by the friction-providing means consisting of the plate springs 17 to 19; and against the elastic force of the coil spring 21, so that these forces against the rotation of the second brake member 13, together with the braking force due to the rotation of the brake member 15, are applied to the first blade unit-driving unit 6 as braking force.

In addition, in the present embodiment, after the driving pin 6e of the first blade unit-driving unit 6 meets the pressed part 13d of the second brake member 13, the end part of the first blade unit-driving spring 7 which is connected with the spring-connection part 6.d of the first blade unit-driving unit 6 meets the pressed part 15c of the first brake member 15 at approximately the same time. As a result, afterward, the elastic force of the first blade unit-driving spring 7 acts on the first brake member 15 in such a way that the first brake member 15 is rotated in the clockwise direction, so that the elastic force of the first blade unit-driving spring 7 controls the counterclockwise rotation of the first brake member 15. As a result, the braking force to the rotation of the first blade unit-driving unit 6 through the first brake member 15 increases much more. Besides, although the end part of the first blade unit-driving spring 7 meets the pressed part 15c of the first brake member 15 with such timing in the present embodiment, the focal plane shutters according to the present invention may be formed in such a way that, after the driving pin 6e of the first blade unit-driving unit 6 meets the pressed part 15b of the first brake member 15, the end part of the first blade unit-driving spring 7 meets the pressed part 15c of the first brake member 15 at approximately the same time.

Figure 7:
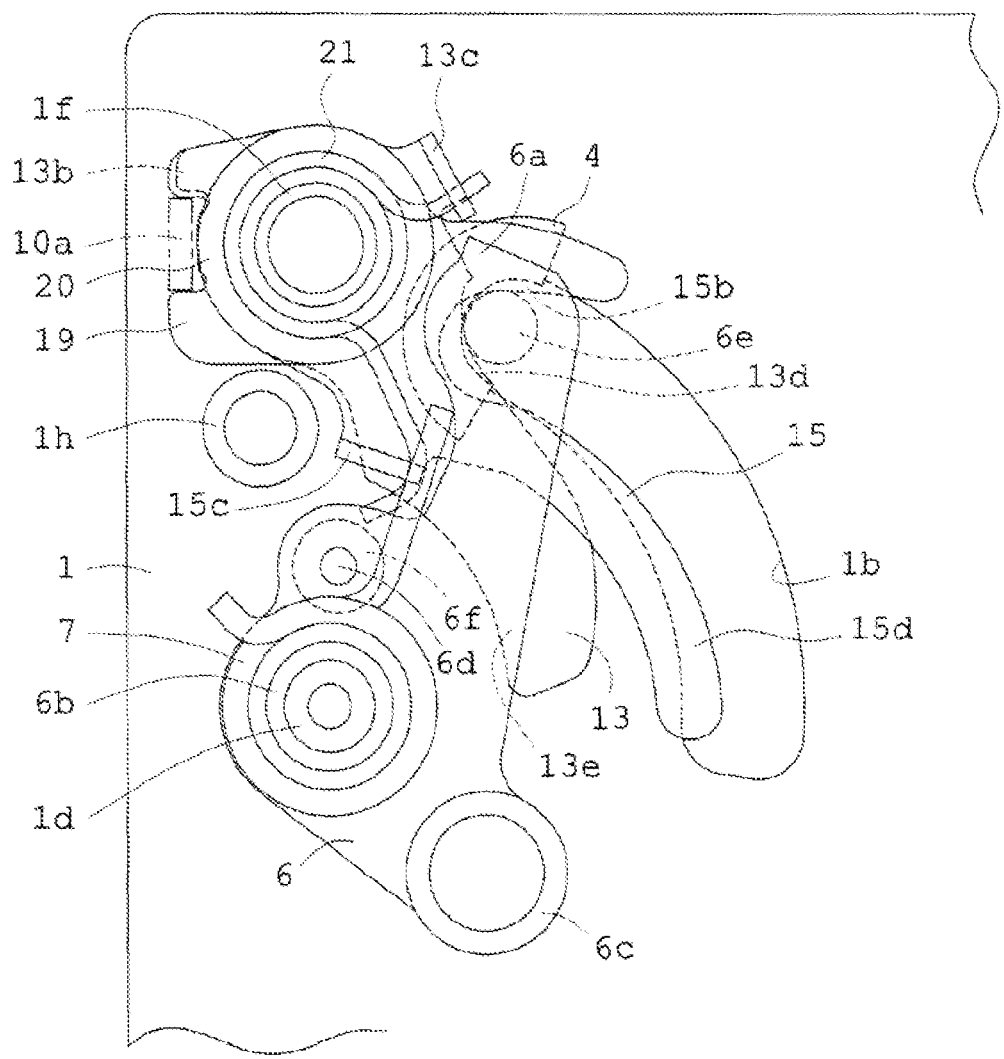
FIG. 7 is a partial plane view for the present embodiment showing a state in which the operation of the first blade unit-driving unit is completed in shooting.

The first blade unit-driving unit 6 is rotated while being favorably braked through the two brake members 13 and 15 by the friction-providing member, the coil spring 21, and the first blade unit-driving spring 7 as described above, and the driving pin 2b then meets the buffer member 4 fitted to the upper edge of the elongate hole 1b, so that the impact on the first blade unit-driving unit 6 is absorbed and the bounce of the first blade unit-driving unit 6 is controlled by the buffer member 4 and the rotation of the first blade unit-driving unit 6 is stopped. As a result, there is neither a situation where the first blade unit is inevitably broken by the impact in stopping the first blade unit-driving unit 6 nor a situation where the first blade unit-driving unit 6 bounces so large as to make the slit-forming blade 26 inevitably close the opening 1a temporarily. FIG. 7 shows a state in which the first blade unit-driving unit 6 is stopped in such a manner. In this case, the three blades 24 to 26 of the first blade unit are folded and stored on the upper side area of the opening 1a.

Besides, although it is possible to favorably brake the first blade unit-driving unit 6 with such a constitution in the present embodiment, the present invention just relates to focal plane shutters which are formed: in such a way that the elastic force of a blade unit-driving spring rotating a blade unit-driving unit is made to positively participate in the braking of the blade unit-driving unit through a brake member so that it is possible to achieve braking force larger than conventional cases; and in such a way that it is possible to surely maintain the performances of a focal plane shutter even though shootings are performed beyond the number of shootings within which conventional focal plane shutters are tolerable. Accordingly, if such a constitution according to the present invention can be made in accordance with respective design specifications for shutters, the constitutions of focal plane shutters according to the present invention are not limited to the constitution of the focal plane shutter of the present embodiment.

That is to say, a braking mechanism according to the present invention may be formed in such a way that: the braking mechanisms includes only the first brake member 15 and the friction-providing means in the present embodiment; and the braking mechanism does not include the second brake member 13 and the coil spring 21. Also, a braking mechanism according to the present invention may be formed in such a way that: the braking mechanism includes only the first brake member 15 and a first coil spring by which only the first brake member 15 is biased in its rotation direction; and the braking mechanisms does not include the second brake member 13 and the friction-providing means. However, in the latter case, a braking mechanism according to the present invention may include the friction-providing means together with the first coil spring, so that it is possible to achieve larger braking force to a blade unit-driving unit.

Also, among the above-described constitutions, in the case where a braking mechanism according to the present invention includes the friction-providing means, the braking mechanism may additionally include the second brake member 13 as in the present embodiment, together with the first brake member 15 in order to increase braking force more. In addition, in the case where a braking mechanism according to the present invention includes the second brake member 13, the braking mechanism may include a second coil spring for biasing the second brake member 13 in its rotation direction, whether the braking mechanism includes the friction-providing means or not. And, in the case where a braking mechanism according to the present invention includes not only the first coil spring but also the second coil spring in such a manner, it becomes advantageous on the cost side to use a single coil spring like the coil spring 21 in the present embodiment both as the first coil spring and as the second coil spring. Accordingly, it is possible to say that the constitution according to the present embodiment is a constitution which makes it possible to achieve the largest braking force of those achieved by constitutions according to the present invention with low cost.

Figure 8:
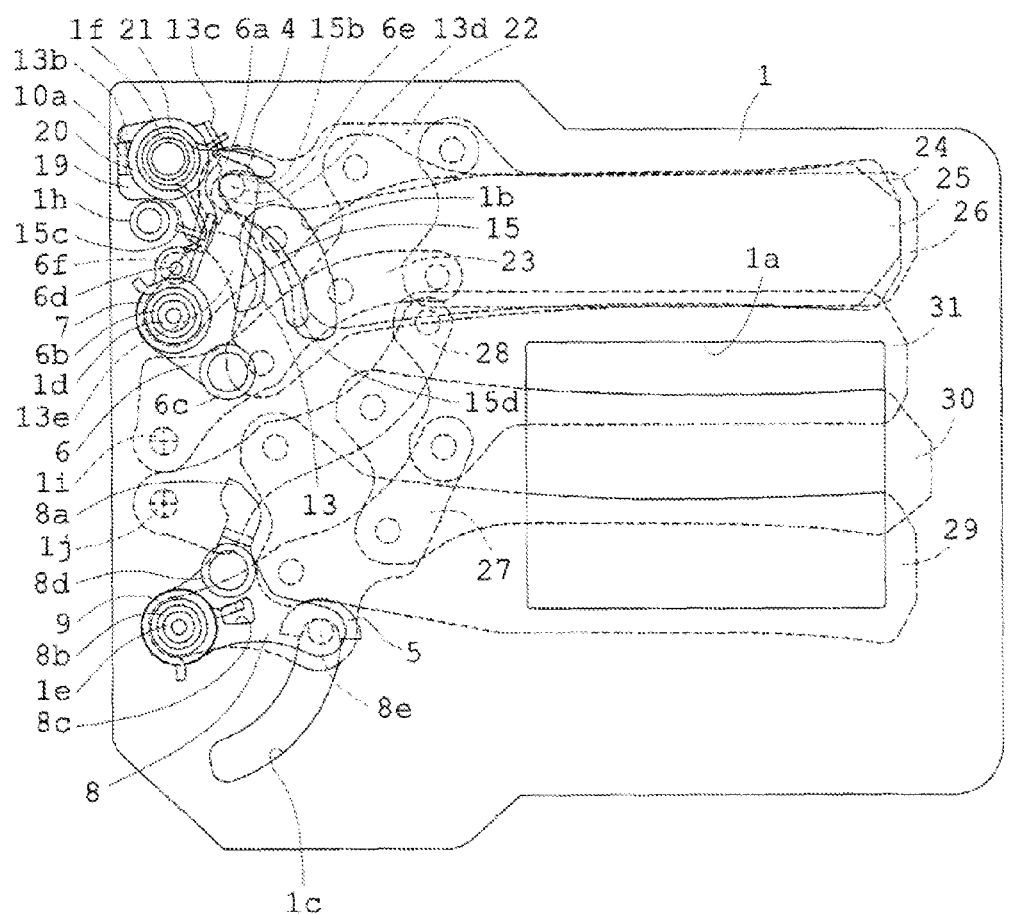
FIG. 8 is a plane view of the whole of the focal plane shutter of the present embodiment showing a state of the focal plane shutter just after the exposure operation of the focal plane shutter is completed.

After the rotation of the first blade unit-driving unit 6 is favorably stopped in the above-described manner, the driving pin 8e of the second blade unit-driving unit 8 is made to meet the buffer member 5 while the second blade unit-driving unit 8 is being braked by another suitable braking means which is not shown in the drawings, so that the rotation of the second blade unit-driving unit 8 is favorably stopped. As a result, there is neither a situation where the second blade unit is inevitably broken by the impact due to the contact between the driving pin 8e and the buffer member 5 nor a situation where the second blade unit-driving unit 8 bounces so large as to make the slit-forming blade 31 inevitably open a part of the opening 1a temporarily. FIG. 8 shows a state in which the second blade unit-driving unit 8 is also stopped in such a manner. In this case, the three blades 29 to 31 of the second blade unit are unfolded and completely cover the opening 1a. Besides, the whole shape of the cover plate 10 which is shown in FIG. 1 is omitted in FIG. 8.

When the exposure operation is completed in the above-described manner, a cocking operation of the focal plane shutter is made to start by a well known cocking member which is not shown in the drawings. In the cases of film-based cameras, the cocking operation starts immediately after the exposure operation is completed. In the cases of digital cameras, the cocking operation starts after imaging information is stored in a storage means. The focal plane shutter of the present embodiment is formed in such a way that: the cocking member which is not shown in the drawings is rotatably fitted to the shutter base plate 1 while the cocking member is being located nearer to the opening 1a than the approximately middle position between the first blade unit-driving and second blade unit-driving units 6 and 8; and a camera body-side member rotates the cocking member from the initial position of the cocking member in the counterclockwise direction against the elastic force of a return spring connected with the cocking member so that the cocking operation is performed.

When the cocking member formed in such a manner and not shown in the drawings is made to start to rotate in the counterclockwise direction in a state of the focal plane shutter shown in FIG. 8, a pressing part of the cocking member first presses the roller 6c, so that the first blade unit-driving unit 6 is made to start to rotate in the clockwise direction against the elastic force of the first blade unit-driving spring 7. Also, as a result of the clockwise rotation of the first blade unit-driving unit 6, the three blades 24 to 26 of the first blade unit which are stored in the position on the upper side of the opening 1a start to move downward while amounts of the overlaps between respective adjacent blades of the three blades 24 and 26 are decreasing and the slit-forming blade 26 is heading the three blades 24 to 26.

Figure 9:
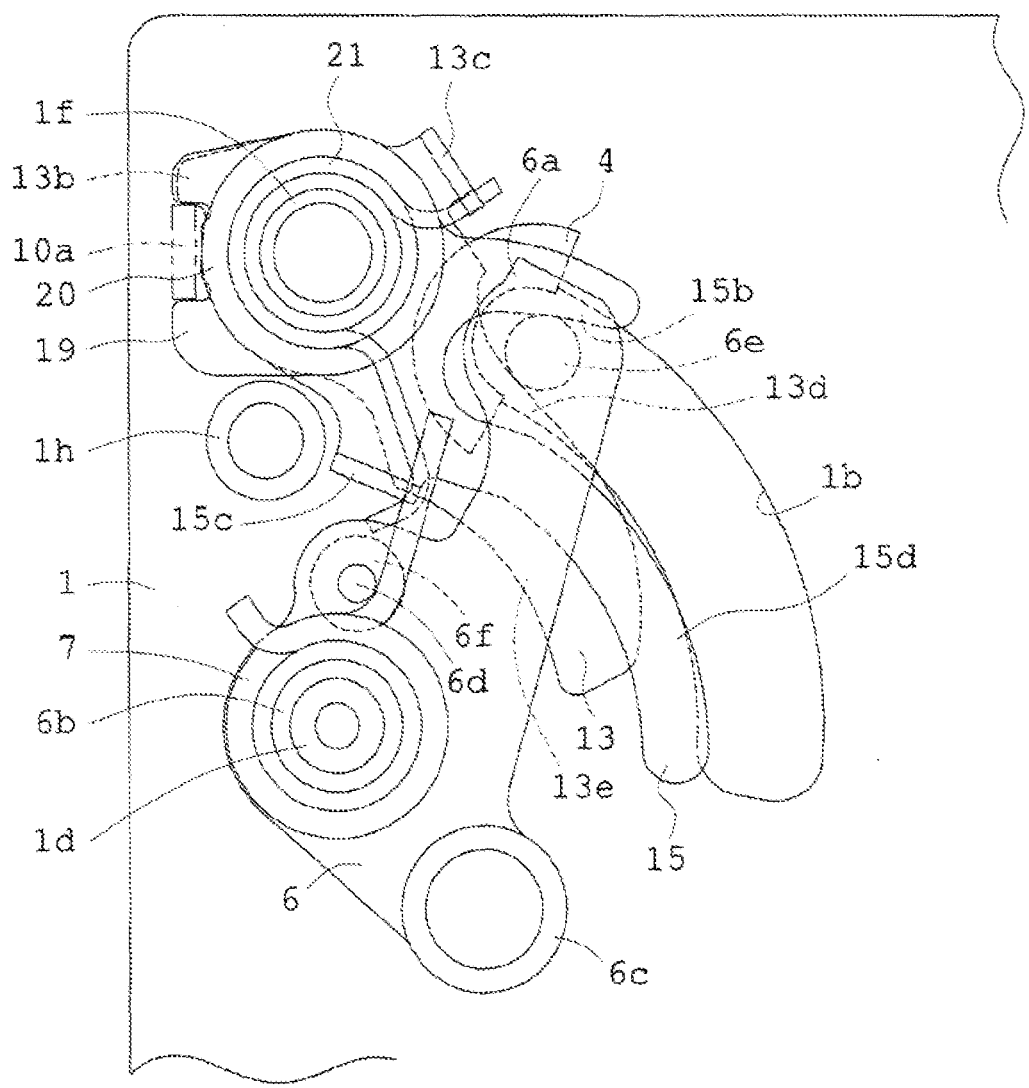
FIG. 9 is a partial plane view for the present embodiment showing a state of the focal plane shutter just after the start of the cocking operation of the first blade unit-driving unit.

As a result, the driving pin 6e of the first blade unit-driving unit 6 moves away from the pressed part 15b of the first brake member 15 and the pressed part 13d of the second brake member 13, from a state of the driving pin 6e shown in FIG. 7, so that the pressed parts 15b and 13d are released from the press of the pressed parts 15b and 13d due to the driving pin 6e. On the other hand, the end part of the first blade unit-driving spring 7 which is connected with the spring-connection part 6d moves away from the pressed part 15c of the first brake member 15, so that the pressed parts 15c is released from the press of the pressed parts 15c due to the end part of the first blade unit-driving spring 7. As a result, the first brake member 15 is rotated in the clockwise direction by the elastic force of the coil spring 21, and the second brake member 13 is rotated in the counterclockwise direction by the elastic force of the coil spring 21. FIG. 9 shows a state of the focal plan shutter just after the two brake members 13 and 15 start to rotate from states of the two brake members 13 and 15 shown in FIG. 7 in such a manner.

At the stage where the driving pin 6e of the first blade unit-driving unit 6 reaches such a state of the driving pin 6e as is shown in FIG. 9, an amount of the overlap between the slit-forming blade 26 of the first blade unit and the slit-forming blade 31 of the second blade unit reaches a predetermined amount. And, at this stage, the cocking member which is not shown in the drawings presses the roller 8d, so that the second blade unit-driving unit 8 is made to start to rotate in the clockwise direction against the elastic force of the second blade unit-driving spring 9. As a result, the three blades 29 to 31 of the second blade unit which have covered the opening 1a until then start to move downward from a state of the three blades 29 to 31 shown in FIG. 8 while amounts of the overlap between respective adjacent blades of the three blades 29 and 31 are increasing. Accordingly, the first blade unit-driving and second blade unit-driving units 6 and 8 continue to rotate in the clockwise direction together afterward.

Figure 10:
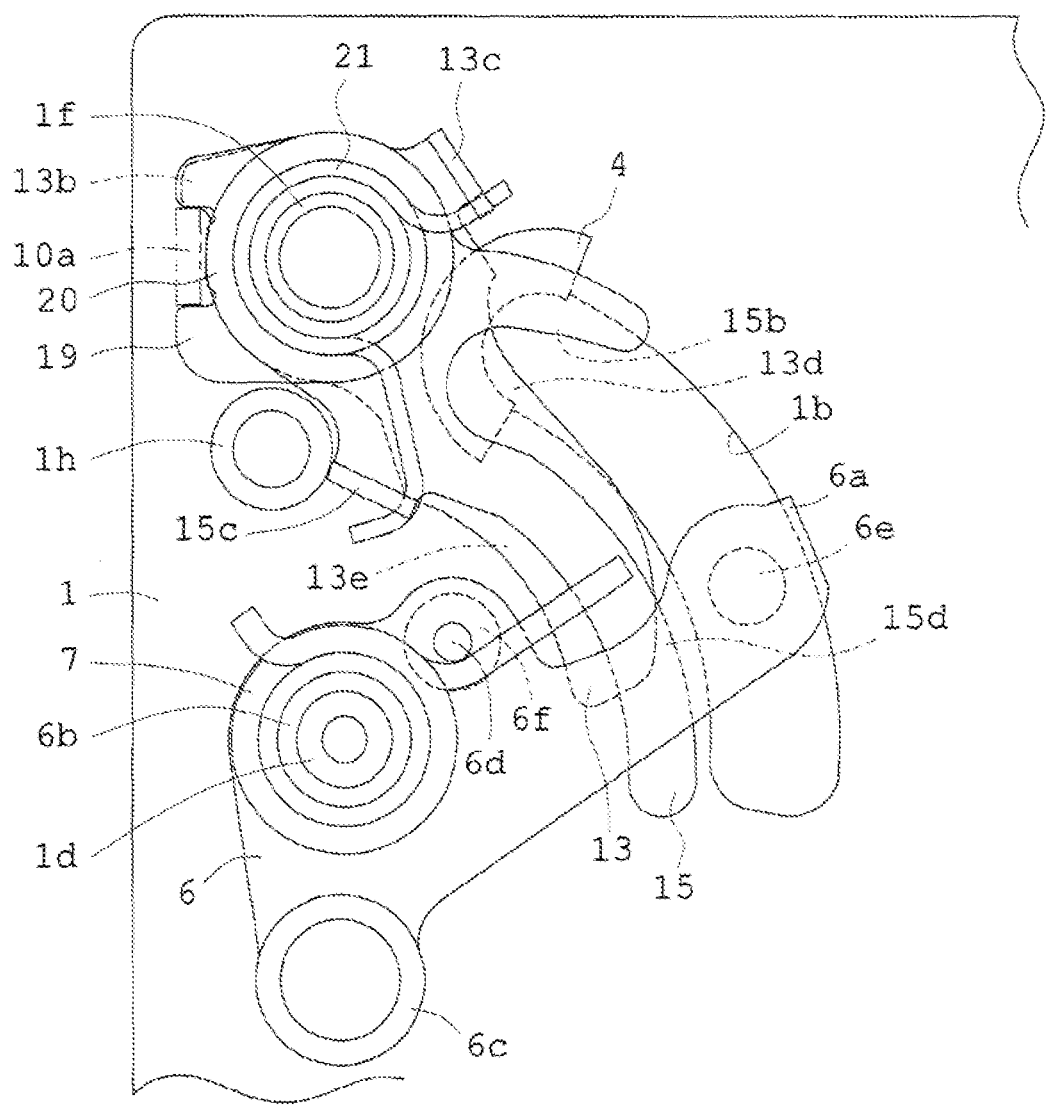
FIG. 10 is a partial plane view for the present embodiment showing a state of the focal plane shutter in the latter half of the cocking operation of the first blade unit-driving unit.

FIG. 10 shows a state in which the first blade unit-driving unit 6 has rotated up to the stage where half or more than half of the process of the cocking operation is completed, in such a manner. In this case, the driving pin 6e of the first blade unit-driving unit 6 is far removed from the pressed parts 13d and 15b of the two brake members 13 and 15, and the end part of the first blade unit-driving spring 7 is also far removed from the pressed part 15c of the first brake member 15. Also, at this point, the two brake members 13 and 15 are rotated by the elastic force of the coil spring 21 while the rotations of the two brake members 13 and 15 are overcoming friction resistant force of the friction-providing means. As a result, in a state of the focal plane shutter shown in FIG. 10, the pressed part 15c of the first brake member 15 meets the stopper 1h, so that the clockwise rotation of the first brake member 15 is stopped. And, the connection part 13b of the second brake member 13 meets the curved part 10a, so that the counterclockwise rotation of the second brake member 13 is stopped. Accordingly, both of the first and second brake members 15 and 13 are made to return their initial positions respectively.

However, in the case of the long-term use of a camera, it is expected that, even though friction resistant force of the friction-providing means is favorably adjusted by changing tightness of the screw 11 in making the focal plane shutter as explained already, there occurs a situation where at least one of the two brake members 13 and 15 does not reach its proper stop position shown in FIG. 9 or its initial position due to moisture or the adhesion of dust despite the fact that the driving pin 6e is in a state of the driving pin 6e shown in FIG. 10, with the result that the one of the two brake members 13 and 15 stops halfway its rotation.

Accordingly, the present invention considers the possibility that such a situation occurs in the present embodiment. In the present embodiment, when such a situation occurs, the driving pin 6e of the first blade unit-driving unit 6 presses the pressed part 15d of the first brake member 15 which remains being in a state of the pressed part 15d shown in FIG. 7 for example, or the roller 6f of the first blade unit-driving unit 6 presses the pressed part 13e of the second brake member 13 which remains being in a state of the pressed part 13e shown in FIG. 7 for example, so that the first brake member 13 or the second brake members 15 can be rotated up to its proper stop position by the elastic force of the coil spring 21 afterward. Accordingly, when there is no necessity to consider the possibility that such a situation occurs, unlike the present embodiment, there is neither the necessity to provide the two brake members 13 and 15 with the pressed parts 13e and 15d respectively nor the necessity to provide the first blade unit-driving unit 6 with the roller 6f.

Besides, although the focal plane shutter of the present embodiment has such a structure, as explained already, the present invention does not necessarily require the coil spring 21 which is provided for the focal plane shutter of the present embodiment. Accordingly, in the case where a focal plane shutter according to the present invention includes a brake member corresponding to the first brake member 15 of the present embodiment and a friction-providing means providing the rotation of the brake member with friction resistant force but includes neither a coil spring for biasing the brake member in its rotation direction nor an auxiliary brake member corresponding to the second brake member 13 of the present embodiment, the focal plane shutter has to be formed in such a way that the brake member is pressed by a driving pin corresponding to the driving pin 6e of the present embodiment or by a pressing part provided for a blade unit-driving unit like a return pin (2b) disclosed in Japanese Utility Model KOUKOKU No. HEI 6-24826 so that the brake member is rotated up to its initial position, in a cocking operation of the focal plane shutter.

Also, in the case where a focal plane shutter according to the present invention further includes an auxiliary brake member corresponding to the second brake member 13 of the present embodiment together with such a structure, the auxiliary brake member has to be returned to its initial position in the cocking operation. However, in the case where the focal plane shutter does not include a coil spring for biasing the auxiliary brake member in its rotation direction, the auxiliary brake member has to be returned to its initial position by a driving pin of a blade unit-driving unit or by a pressing part provided for the blade unit-driving unit, as in the case of the above-described brake member. However, in the case where the focal plane shutter is made to have such a structure, it is preferred that the focal plane shutter is formed in such a way that the auxiliary brake member is pressed by a pressing part corresponding to the roller 6f of the present embodiment when the focal plane shutter is formed in such a way that the above-described brake member is pressed by the driving pin.

When the cocking operation goes on in the above-described manner, the three blades 29 to 31 of the second blade unit are folded and stored at the position on the lower side of the opening 1a, and then the three blades 24 to 26 of the first blade unit are unfolded and cover the opening 1a, the engagement part 6a of the first blade unit-driving unit 6 and the engagement part 8a of the second blade unit-driving unit 8 reach states in which the engagement parts 6a and 8a can engage with engaging parts not shown in the drawings, respectively. On the other hand, in such a cocking operation, the iron piece members fitted to the locked first blade unit-releasing unit and to the locked second blade unit-releasing unit respectively are made to come into contact with the electromagnets for the first and second blade units respectively by the cocking member, the locked first blade unit-releasing and locked second blade unit-releasing units being publically known and being not shown in the drawings, so that the member different from the electromagnets keeps the iron piece members of the locked first blade unit-releasing and locked second blade unit-releasing units coming into contact with the electromagnets for the first and second blade units respectively until the iron piece members are attracted and held by the electromagnets respectively in next shooting.

And, when the focal plane shutter reaches such a state, the cocking member is released from the pressing force which is caused by the camera body-side member not shown in the drawings and which makes the coking member rotate in the counterclockwise direction until then, so that the coking member is made to reverse in the clockwise direction by the elastic force of the return spring and returns to its initial position. As a result, the first blade unit-driving unit 6 and the second blade unit-driving unit 8 are slightly rotated in the clockwise direction by the elastic forces of the first blade unit-driving and second blade unit-driving springs 7 and 9 respectively, in response to the reverse rotation of the cocking member, and then the engaged parts 6a and 8a engage with the engaging parts respectively, so that the first blade unit-driving and second blade unit-driving units 6 and 8 are stopped. A state of the focal plane shutter in which the cocking operation is completed in such a manner is a state of the focal plane shutter shown in FIG. 1, or a state in which the focal plane shutter is standby for next shooting.

Besides, the present embodiment relates to a focal plane shutter which includes two shutter blade units and in which only the first blade unit-driving unit 6 is provided with a braking mechanism typical of the present invention. However, when the first blade unit-driving unit 6, the first blade unit-driving spring 7, and the first blade unit are removed from the focal plane shutter of the present embodiment and the second blade unit-driving unit 8 is provided with the braking mechanism, it is possible to achieve a locking-type focal plan shutter which is one of embodiments of the present invention and which is provided with a single shutter blade unit.

What is claimed is:

1. A focal plane shutter for cameras provided with one or two shutter blade units opening and closing an exposure aperture, one or two shutter blade unit-driving units which include driving pins connected to the shutter blade units respectively, which are rotatably fitted to a shutter base plate, and which rotate in a reciprocating manner to make the shutter blade units open and close the exposure aperture respectively, one or two driving springs one end part of each of which is connected with a spring-connection part of a shutter blade unit-driving unit, each of which is tensed by rotating the shutter blade unit-driving unit in one direction in the cocking operation, and each of which rotates the shutter blade unit-driving unit in the other direction through the elastic force of the driving spring in shooting, and a braking mechanism which is provided for the one shutter blade unit-driving unit or at least one of the two shutter blade unit-driving units and which brakes the rotation of the shutter blade unit-driving unit in the other direction at the stage just before the completion of the rotation, wherein the braking mechanism is provided with a brake member which has a first part to be pushed, a second part to be pushed, and a third part to be pushed, which is rotatably fitted to a fitting shaft erectly provided on the shutter base plate, which is in its initial position in which the first part is located in the trajectory of the operation of the driving pin in the cocked state, which is rotated from its initial position by the driving pin pushing the first part while force against the rotation of the brake member from its initial position is applied to the brake member by pushing the end part of the driving spring as a result of the contact between the second part and the one end part of the driving spring at the final stage of the rotation of the shutter blade unit-driving unit in the other direction, and which is released from the press of the first part due to the driving pin and from the press of the second part due to the end part of the driving spring in the cocking operation, and a friction-providing means which includes at least one plate spring, which is fitted to the fitting shaft, and by which friction resistant force is applied to the rotation of the brake member, and the brake member is adapted to be returned to its initial position through the third part by being pushed by the driving pin or a pushing part provided for the driving unit in the cocking operation.

2. A focal plane shutter for cameras according to claim 1, wherein the one or two springs for the brake member are coil springs.

3. A focal plane shutter for cameras according to claim 1, wherein an auxiliary brake member including a first part to be pushed and a second part to be pushed is rotatably fitted to the fitting shaft, and the auxiliary brake member is formed in such a way that friction resistant force is applied to the auxiliary brake member together with the brake member by the friction-providing means, the auxiliary brake member is in its initial position in which the first part is located in the trajectory of the movement of the driving pin of the shutter blade unit-driving unit in the cocked state, the auxiliary brake member is rotated by the driving pin pressing the first part at the final stage of the rotation of the driving unit in shooting, and the auxiliary brake member is returned to its initial position by pushing the second part through the driving pin or a pressing part provided for the driving unit, in the cocking operation.

4. A focal plane shutter for cameras according to claim 3, wherein one of the two driving units is composed of a first driving member and a second driving member which are rotatably fitted to the same shaft on the shutter base plate, the first driving member includes the driving pin, the one end part of the driving spring is connected with a spring-connection part of the second driving member, and the second driving member presses the first driving member with the elastic force of the driving spring and rotates the first driving member in the other direction, in shooting.

5. A focal plane shutter for cameras according to claim 1, further comprising an auxiliary brake member which has a part to be pushed, which is rotatably fitted to the fitting shaft, the rotation of which, together with the rotation of the brake member, is given friction resistant force by the friction-providing means, which is in its initial position in which the part to be pushed is located in the trajectory of the movement of the driving pin of the shutter blade unit-driving unit in the cocking state, and which is rotated by the driving pin pushing the part to be pushed at the final stage of the rotation of the driving unit in shooting; and a spring for the auxiliary brake member which is connected with the auxiliary brake member, which is tensed when the auxiliary brake member is rotated from its initial position, and the elastic force of which makes the auxiliary brake member return to its initial position when the auxiliary brake member is released from the push of the part to be pushed due to the driving pin.

6. A focal plane shutter for cameras according to claim 5, wherein the springs for the brake member and for the auxiliary brake member consist of one coil spring which is wound around the fitting shaft, one end part of the coil spring is connected with the brake member and the other end part of the coil spring is connected with the auxiliary brake member, the brake member and the auxiliary brake member are pressed by the driving pin at the final stage of the rotation of the driving unit in shooting and are rotated from respective their initial positions against the elastic force of the one coil spring in the directions opposite to each other, and the brake member and the auxiliary brake member are returned to respective their initial positions by the elastic force of the one coil spring in the cocking operation.

7. A focal plane shutter for cameras according to claim 6, wherein one of the two driving units is composed of a first driving member and a second driving member which are rotatably fitted to the same shaft on the shutter base plate, the first driving member includes the driving pin, the one end part of the driving spring is connected with a spring-connection part of the second driving member, and the second driving member presses the first driving member with the elastic force of the driving spring and rotates the first driving member together with the second driving member in the other direction, in shooting.

8. A focal plane shutter for cameras according to claim 5, wherein one of the two driving units is composed of a first driving member and a second driving member which are rotatably fitted to the same shaft on the shutter base plate, the first driving member includes the driving pin, the one end part of the driving spring is connected with a spring-connection part of the second driving member, and the second driving member presses the first driving member with the elastic force of the driving spring and rotates the first driving member together with the second driving member in the other direction, in shooting.

9. A focal plane shutter for cameras according to claim 1, wherein one of the two driving units is composed of a first driving member and a second driving member which are rotatably fitted to the same shaft on the shutter base plate, the first driving member includes the driving pin, the one end part of the driving spring is connected with a spring-connection part of the second driving member, and the second driving member presses the first driving member with the elastic force of the driving spring and rotates the first driving member together with the second driving member in the other direction, in shooting.

10. A focal plane shutter for cameras provided with one or two shutter blade units opening and closing an exposure aperture, one or two shutter blade unit-driving units which have driving pins connected to the shutter blade units respectively, which are rotatably fitted to a shutter base plate, and which rotate in a reciprocating manner to make the shutter blade units open and close the exposure aperture, one or two driving springs one end part of each of which is connected with the driving unit, each of which is tensed by rotating the driving unit in one direction in the cocking operation, and each of which rotates the driving unit in the other direction through the elastic force of the driving spring in shooting, and a braking mechanism which is provided for the one driving unit or at least one of the two driving units and which brakes the rotation of the driving unit in the other direction at the stage just before the completion of the rotation, wherein the braking mechanism is provided with a brake member which has a first part to be pushed and a second part to be pushed, which is rotatably fitted to a fitting shaft erectly provided on the shutter base plate, which is in its initial position in which the first part is located in the trajectory of the movement of the driving pin in the cocked state, which is rotated from its initial position by the driving pin pressing the first part while force against the rotation from its initial position is applied to the brake member by pressing the one end part of the driving spring as a result of the contact between the second part and the end part of the driving spring at the final stage of the rotation of the driving unit in the other direction, and which is released from the push of the first part due to the driving pin and from the push of the second part due to the end part of the driving spring in the cocking operation; and a spring for the brake member which is connected with the brake member, which is tensed when the brake member is rotated from its initial position, and the elastic force of which makes the brake member return to its initial position when the brake member is released from the press of the first part due to the driving pin.

11. A focal plane shutter for cameras according to claim 10, wherein a friction-providing means which includes at least one plate spring and by which friction resistant force is applied to the rotation of the brake member is fitted to the fitting shaft.

12. A focal plane shutter for cameras according to claim 11, wherein one of the two driving units is composed of a first driving member and a second driving member which are rotatably fitted to the same shaft on the shutter base plate, the first driving member includes the driving pin, the one end part of the driving spring is connected with a spring-connection part of the second driving member, and the second driving member presses the first driving member with the elastic force of the driving spring and rotates the first driving member together with the second driving member in the other direction, in shooting.

13. A focal plane shutter for cameras according to claim 11, wherein an auxiliary brake member including a first part to be pushed and a second part to be pushed is rotatably fitted to the fitting shaft, and the auxiliary brake member is formed in such a way that friction resistant force is applied to the auxiliary brake member together with the brake member by the friction-providing means, the auxiliary brake member is in its initial position in which the first part is located in the trajectory of the movement of the driving pin of the shutter blade unit-driving unit in the cocked state, the auxiliary brake member is rotated by the driving pin pressing the first part at the final stage of the rotation of the driving unit in shooting, and the auxiliary brake member is returned to its initial position by pushing the second part through the driving pin or a pressing part provided for the driving unit, in the cocking operation.

14. A focal plane shutter for cameras according to claim 13, wherein one of the two driving units is composed of a first driving member and a second driving member which are rotatably fitted to the same shaft on the shutter base plate, the first driving member includes the driving pin, the one end part of the driving spring is connected with a spring-connection part of the second driving member, and the second driving member presses the first driving member with the elastic force of the driving spring and rotates the first driving member in the other direction, in shooting.

15. A focal plane shutter for cameras according to claim 10, wherein the one or two springs for the brake member are coil springs.

16. A focal plane shutter for cameras according to claim 10, further comprising an auxiliary brake member which has a part to be pushed, which is rotatably fitted to the fitting shaft, the rotation of which, together with the rotation of the brake member, is given friction resistant force by the friction-providing means, which is in its initial position in which the part to be pushed is located in the trajectory of the movement of the driving pin of the shutter blade unit-driving unit in the cocking state, and which is rotated by the driving pin pushing the part to be pushed at the final stage of the rotation of the driving unit in shooting; and a spring for the auxiliary brake member which is connected with the auxiliary brake member, which is tensed when the auxiliary brake member is rotated from its initial position, and the elastic force of which makes the auxiliary brake member return to its initial position when the auxiliary brake member is released from the push of the part to be pushed due to the driving pin.

17. A focal plane shutter for cameras according to claim 16, wherein the springs for the brake member and for the auxiliary brake member consist of one coil spring which is wound around the fitting shaft, one end part of the coil spring is connected with the brake member and the other end part of the coil spring is connected with the auxiliary brake member, the brake member and the auxiliary brake member are pressed by the driving pin at the final stage of the rotation of the driving unit in shooting and are rotated from respective their initial positions against the elastic force of the one coil spring in the directions opposite to each other, and the brake member and the auxiliary brake member are returned to respective their initial positions by the elastic force of the one coil spring in the cocking operation.

18. A focal plane shutter for cameras according to claim 17, wherein one of the two driving units is composed of a first driving member and a second driving member which are rotatably fitted to the same shaft on the shutter base plate, the first driving member includes the driving pin, the one end part of the driving spring is connected with a spring-connection part of the second driving member, and the second driving member presses the first driving member with the elastic force of the driving spring and rotates the first driving member together with the second driving member in the other direction, in shooting.

19. A focal plane shutter for cameras according to claim 16, wherein one of the two driving units is composed of a first driving member and a second driving member which are rotatably fitted to the same shaft on the shutter base plate, the first driving member includes the driving pin, the one end part of the driving spring is connected with a spring-connection part of the second driving member, and the second driving member presses the first driving member with the elastic force of the driving spring and rotates the first driving member together with the second driving member in the other direction, in shooting.

20. A focal plane shutter for cameras according to claim 10, wherein one of the two driving units is composed of a first driving member and a second driving member which are rotatably fitted to the same shaft on the shutter base plate, the first driving member includes the driving pin, the one end part of the driving spring is connected with a spring-connection part of the second driving member, and the second driving member presses the first driving member with the elastic force of the driving spring and rotates the first driving member together with the second driving member in the other direction, in shooting.

* * * * *